Oct. 17, 1950   L. J. McLANE   2,526,080
FISHING ROD HANDLE
Filed Nov. 26, 1946
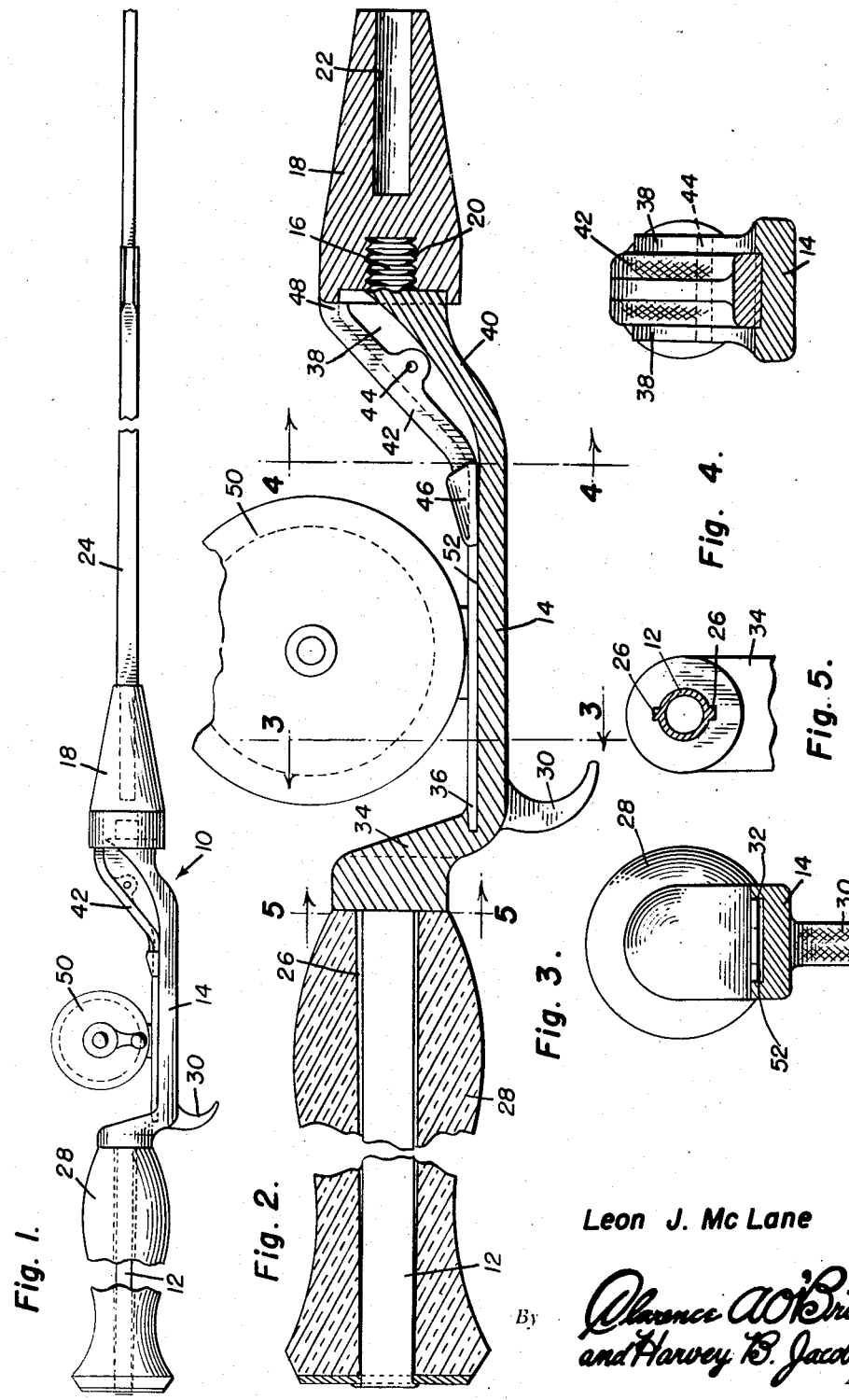
Inventor
Leon J. McLane Patented Oct. 17, 1950

2,526,080

UNITED STATES PATENT OFFICE 2,526,080

FISHING ROD HANDLE

Leon J. McLane, Gulfport, Fla.

Application November 26, 1946, Serial No. 712,392

4 Claims. (Cl. 43—22)

The present invention relates to a novel and useful improvement in a fishing rod handle and more specifically pertains to an improved grip and reel supporting means which may be readily engaged to various types of fishing rods and hand grips therefor.

The primary objects of the invention reside in providing an offset handle for fishing rods which has a simplified construction for mounting and securing a fishing reel thereon; wherein a novel and highly efficient locking mechanism is provided for retaining the reel upon the handle; wherein an adapter element for attaching various sizes and types of fishing rods to the handle may be caused to function as a lock for the latching means; and wherein a compact, simplified, inexpensive and durable construction is provided for the purposes intended.

These, together with various ancillary objects of the invention which will later become apparent as the following description proceeds, are realized by my device, one embodiment of which has been illustrated by way of example only in the accompanying drawings, wherein:

Figure 1 is a side elevational view showing the invention applied to one form of a fishing rod;

Figure 2 is an enlarged longitudinal vertical sectional view taken through the offset handle construction of the device;

Figure 3 is a detailed view being taken in transverse section substantially upon the line 3—3 of Figure 2;

Figure 4 is a detailed view taken substantially upon the section line 4—4 of Figure 2; and, Figure 5 is a detailed view in vertical section being taken on the line 5—5 of Figure 2.

Referring now more specifically to the annexed drawings, wherein like numerals indicate similar parts throughout the several views, numeral 10 designates my improved handle which, as shown best in Figure 2, comprises a rearwardly extending handle receiving shank portion 12 from the forward end of which extends an offset reel receiving portion 14 which latter is provided with a forwardly extending screw threaded rod-like member 16 constituting a rod receiving portion. A chuck 18 has a socket 20 at its rear end for detachable engagement with the screw threaded portion 16, while its front end has an axially extending socket or bore 22 which is of sufficient diameter and depth to firmly support a rod 24 of any desired type. It will be understood, that a series of chucks or forearms 18 may be provided each of which is adapted to engage upon the threaded member 16 and each of whose forwardly extending sockets 22 is designed to engage and support the particular size or type of fishing rod.

The shank portion 12 is provided with two or more longitudinally extending tapering splines 26 which are adapted to frictionally engage and retain a hand gripping member 28 which may be formed of any desired material and contour. As will be understood, by reference to Figure 5, the shank portion 12 is preferably formed of tubular construction in order to minimize the weight thereof. Depending below the rearward end of the offset portion 14, is a curved finger grip 30 to facilitate the gripping of the rod by the fisherman. As shown best in Figures 2 and 3, the inner surface of the offset portion 14 is provided with a longitudinally extending recess or channel 32 whose rearward end extends under the end wall 34 of the offset member to provide a cavity or recess 36 for a purpose to be subsequently set forth. At its forward end, the offset portion 14 has an angularly disposed forward wall 40, upon which are provided a pair of longitudinally extending laterally spaced flanges or webs 38 between which is journalled a latching member 42 by means of a detachable pin 44 positioned intermediate the length of the latching member and of the flanges. The rearward end of the latching member 42 is provided with an enlargement 46 and has a planar lower surface adapted for disposition in parallel arrangement to the channel 32, while the forward end of the lever 42 is designed for abutting engagement by the rear surface of the socket or chuck 18 whereby when the latter is fully screwed and seated upon the portion 16, it serves to bias the latch 42 in a counterclockwise direction about the pivot 44 until the member 46 is pressed downwardly upon the surface of the offset portion 14.

A fishing reel 50 of conventional design having the customary reel mounting flange or base plate 52 is mounted upon the offset portion 14 by causing the rearward end of the base plate 52 to be firmly inserted in the recess or socket 36, while the forward end of the plate 52 is detachably retained in the recess or channel 32 by means of the superimposed member 46, which latter is retained in locking position by means of the rear shoulder of the chuck 18 as aforesaid.

From the foregoing, it is believed that the construction and manner of employing the device will be readily apparent. A reel may be readily removed from the offset handle by merely unscrewing the chuck 18, whereupon the forward end 48 of the latch 42 is free to oscillate about the pivot 44. As a result of such oscillation, the rear end 46 of the latch is elevated sufficiently to permit the forward end of the base plate 52 to be released from the channel 32, and the base plate withdrawn from the recess 36. The mounting of the reel upon the offset handle will be performed in a reverse manner as readily understood.

It will be understood that the detachable hand grip 28 which may be formed as a plastic, cork or other suitable attractive construction, may be detachably positioned upon the splines 26 or may be permanently secured thereto as desired. The offset handle 10 may therefore be readily employed with a variety of hand grips 28 or with any one of a series of chucks 18 and assorted fishing rod shafts 24.

I claim:

1. A handle for fishing rods and the like, comprising a hand grip receiving portion, a rod receiving portion and an offset reel receiving portion, a sleeve on said rod receiving portion, said offset portion having a channel receiving the base mounting plate of a reel and a recess at one end of said channel and offset portion for anchoring one end of said reel mounting plate, a latch intermediately pivoted to the other end of said offset portion and retaining the other end of said reel mounting plate, said latch being secured in locking position upon said mounting plate by abutting engagement with said sleeve on said rod receiving portion.

2. A handle for fishing rods and the like, comprising a hand grip receiving portion, a rod receiving portion and an offset reel receiving portion, said offset portion having a channel receiving the base mounting plate of a reel and a recess at one end of said channel and offset portion for anchoring one end of said reel mounting plate, a latch intermediately pivoted to the other end of said offset portion and retaining the other end of said reel mounting plate, said latch being secured in locking position upon said mounting plate by said rod receiving portion, said rod receiving portion including a screw threaded extension, a rod receiving chuck detachably engaging said screw threaded extension, the rear of said chuck engaging said latch and blocking its releasing movement.

3. A handle for fishing rods and the like, comprising a hand grip receiving portion, a rod receiving portion and an offset reel receiving portion, said rod receiving portion having a sleeve threadedly received thereon, said offset portion having a channel receiving the base mounting plate of a reel and a recess at one end of said channel and offset portion for anchoring one end of said reel mounting plate, a latch pivoted to the other end of said offset portion and having one end retaining the other end of said reel mounting plate, said latch being secured in locking position upon said mounting plate by the other end of said latch abutting with said sleeve carried by said rod receiving portion, and forward end of said offset portion being provided with longitudinally extending, laterally spaced flanges, said latch being pivoted intermediate its ends between said flanges.

4. A handle for fishing rods and the like, comprising a hand grip receiving portion, a rod receiving portion having a screw threaded extension and an offset reel receiving portion, said offset portion having a channel receiving the base mounting plate of a reel and a recess at one end of said channel and offset portion for anchoring one end of said reel mounting plate, a latch pivoted to the other end of said offset portion and retaining the other end of said reel mounting plate, said latch being secured in locking position upon said mounting plate by said rod receiving portion, the forward end of said offset portion being provided with longitudinally extending, laterally spaced flanges, said latch being pivoted intermediate its ends between said flanges, a rod receiving chuck on said extension the rear end of said latch being adapted to overlie and hold down the said other end of said reel mounting plate and the front end of said latch being abutted by the rear end of said chuck to prevent pivotal movement of said latch.

LEON J. McLANE.

REFERENCES CITED

The following references are of record in the file of this patent:

UNITED STATES PATENTS

| Number | Name | Date |
|---|---|---|
| 1,497,364 | Dunkelberger | June 10, 1924 |
| 2,421,240 | Camburn | May 27, 1947 |
| 2,422,084 | Dorner | June 10, 1947 |